US012659449B2

(12) United States Patent
Yamamoto

(10) Patent No.: US 12,659,449 B2
(45) Date of Patent: Jun. 16, 2026

(54) STEREOSCOPIC DISPLAY DEVICE AND SHUTTER PANEL

(71) Applicant: Sharp Display Technology Corporation, Kameyama City (JP)

(72) Inventor: Keiichi Yamamoto, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 79 days.

(21) Appl. No.: 18/217,644

(22) Filed: Jul. 3, 2023

(65) Prior Publication Data

US 2024/0015276 A1     Jan. 11, 2024

(30) Foreign Application Priority Data

Jul. 8, 2022    (JP) ................................. 2022-110493

(51) Int. Cl.
| | |
|---|---|
| *H04N 13/337* | (2018.01) |
| *G02B 30/24* | (2020.01) |
| *G02B 30/25* | (2020.01) |
| *G02F 1/01* | (2006.01) |
| *G02F 1/133* | (2006.01) |
| *H04N 13/341* | (2018.01) |
| *H04N 13/398* | (2018.01) |

(52) U.S. Cl.
CPC ........... *H04N 13/337* (2018.05); *G02B 30/24* (2020.01); *G02B 30/25* (2020.01); *G02F 1/0136* (2013.01); *G02F 1/13306* (2013.01);

*H04N 13/341* (2018.05); *H04N 13/398* (2018.05); *H04N 2213/008* (2013.01)

(58) Field of Classification Search
CPC .. H04N 13/337; H04N 13/341; H04N 13/398; H04N 2213/008; G02B 30/24; G02B 30/25; G02F 1/0136; G02F 1/13306
See application file for complete search history.

(56) References Cited

U.S. PATENT DOCUMENTS

| | | | | |
|---|---|---|---|---|
| 8,537,292 B2 * | 9/2013 | Lin | ......................... | G02B 30/31 |
| | | | | 348/51 |
| 8,553,162 B2 | 10/2013 | Yamaguchi | | |
| 9,402,071 B2 * | 7/2016 | Niwano | ............... | H04N 13/324 |
| 9,906,777 B2 | 2/2018 | Kikuchi | | |

(Continued)

FOREIGN PATENT DOCUMENTS

| | | | | |
|---|---|---|---|---|
| EP | 2423909 A1 * | 2/2012 | .......... | G09G 3/3233 |
| JP | 2002-101427 A | 4/2002 | | |

(Continued)

*Primary Examiner* — Richard A Hansell, Jr.
(74) *Attorney, Agent, or Firm* — ScienBiziP, P.C.

(57) ABSTRACT

A stereoscopic display device includes a display panel and a shutter panel. The shutter panel includes a liquid crystal layer, segment electrodes, a counter electrode and an auxiliary electrode that are connected to the ground, an insulating layer, and a shutter panel drive circuit. The shutter panel drive circuit switches a voltage applied to the segment electrodes between a first drive voltage and a ground voltage in synchronization with a switching of a display of the display panel. The auxiliary electrode is arranged on a side opposite to the liquid crystal layer with respect to the counter electrode. The insulating layer is arranged between the counter electrode and the auxiliary electrode.

13 Claims, 13 Drawing Sheets

(56) References Cited

U.S. PATENT DOCUMENTS

| | | | |
|---|---|---|---|
| 12,105,867 B2 * | 10/2024 | von und zu Liechtenstein ........... G06F 3/012 | |
| 2007/0229951 A1 | 10/2007 | Jung et al. | |
| 2009/0201362 A1 * | 8/2009 | Shestak ................ H04N 13/302 348/56 | |
| 2011/0170026 A1 * | 7/2011 | Lin ........................ G02B 30/31 349/15 | |
| 2013/0141402 A1 | 6/2013 | Lee | |
| 2014/0063211 A1 * | 3/2014 | Fang ..................... G02B 30/28 348/54 | |
| 2014/0198099 A1 * | 7/2014 | Tseng ..................... G02B 30/31 345/419 | |
| 2015/0109269 A1 * | 4/2015 | Sung .................... H04N 13/305 345/206 | |
| 2016/0091725 A1 * | 3/2016 | Kim .................. G02F 1/133528 349/15 | |
| 2016/0202564 A1 * | 7/2016 | Kim .................. G02F 1/134309 257/72 | |
| 2017/0251202 A1 * | 8/2017 | Hamagishi ........... H04N 13/315 | |
| 2018/0052342 A1 * | 2/2018 | Chang .............. G02F 1/134363 | |
| 2020/0333909 A1 * | 10/2020 | Chen ...................... G06F 3/0412 | |
| 2021/0072821 A1 * | 3/2021 | von und zu Liechtenstein ........... G02C 7/086 | |
| 2023/0333402 A1 | 10/2023 | Hasegawa | |

FOREIGN PATENT DOCUMENTS

| | | | |
|---|---|---|---|
| JP | 2013-235208 A | 11/2013 | |
| JP | 5426078 B2 | 2/2014 | |

* cited by examiner

STEREOSCOPIC DISPLAY DEVICE AND SHUTTER PANEL

CROSS-REFERENCE TO RELATED APPLICATIONS

This application claims the benefit of priority to Japanese Patent Application Number 2022-110493 filed on Jul. 8, 2022. The entire contents of the above-identified application are hereby incorporated by reference.

BACKGROUND

Technical Field

The disclosure relates to a stereoscopic display device and a shutter panel.

In the related art, a stereoscopic display device and a shutter panel are known. For example, such a stereoscopic display device is disclosed in JP 2002-101427 A. The stereoscopic display device disclosed in JP 2002-101427 A includes a liquid crystal display device, a liquid crystal shutter screen, a liquid crystal shutter control circuit, and polarizing glasses. The liquid crystal display device alternately displays a right-eye image and a left-eye image in a time division manner. The liquid crystal shutter screen includes two transparent electrodes and a liquid crystal layer arranged between the two transparent electrodes. The liquid crystal shutter control circuit supplies a voltage to any one of the two transparent electrodes in accordance with a display timing of the left-eye image or a display timing of the right-eye image by the liquid crystal display device, and switches a polarization direction of light from the liquid crystal display device. That is, a rectangular wave is supplied from the liquid crystal shutter control circuit to the liquid crystal shutter screen. The polarizing glasses include a filter arranged in a right-eye portion and transmitting light having a polarization component in a vertical direction, and a filter arranged in a left-eye portion and transmitting light having a polarization component in a horizontal direction. An observer wearing the polarizing glasses views a stereoscopic image.

SUMMARY

Here, in a stereoscopic display device of the related art such as disclosed in JP 2002-101427 A mentioned above, a drive voltage is supplied from a liquid crystal shutter control circuit to a first electrode that is one of two electrodes of a liquid crystal shutter screen, and a second electrode that is the other one of the two electrodes is connected to a fixed potential. However, the second electrode is connected to the fixed potential via a wiring line and a common transition material, and thus, a wiring line resistance and a resistance of the common transition material are generated in a path between the second electrode and a reference potential. Therefore, when the drive voltage is supplied from the liquid crystal shutter control circuit to the first electrode, the potential of the second electrode changes from the reference potential due to the wiring line resistance, the resistance of the common transition material, and the electric capacitance of the liquid crystal layer, and the time constant of the waveform of the voltage applied to the liquid crystal layer (the potential difference between the first electrode and the second electrode) increases. As a result, there is a problem in that the switching of the polarization direction of light by the liquid crystal shutter screen is delayed with respect to the display timing of the liquid crystal display device.

The disclosure has been made to solve the problems described above and an object of the disclosure is to provide a stereoscopic display device and a shutter panel capable of preventing a delay in the timing when the polarization direction of light is changed by the shutter panel with respect to the display timing of the display panel.

In order to solve the problems described above, a stereoscopic display device according to a first aspect of the disclosure includes a display panel configured to alternately switch and display a left-eye image and a right-eye image, and a shutter panel configured to switch between a state where light incident from the display panel is changed into emission light having a first polarization direction and the emission light is output and a state where light incident from the display panel is changed into emission light having a second polarization direction and the emission light is output, and the shutter panel includes a first electrode, a second electrode connected to a fixed potential, a liquid crystal layer arranged between the first electrode and the second electrode, a drive circuit configured to apply, to the first electrode, any one of a first voltage changing a polarization direction of the emission light into the first polarization direction and a second voltage changing the polarization direction of the emission light into the second polarization direction, the drive circuit being configured to switch a voltage applied to the first electrode between the first voltage and the second voltage in synchronization with the display panel switching between a display of the left-eye image and a display of the right-eye image, a third electrode connected to the fixed potential and arranged on a side opposite to the liquid crystal layer with respect to the second electrode, and an insulating layer arranged between the second electrode and the third electrode.

A shutter panel according to a second aspect is a shutter panel configured to switch between a state where light incident from a display panel configured to alternately switch and display a left-eye image and a right-eye image is changed into emission light having a first polarization direction and the emission light is output and a state where light incident from the display panel is changed into emission light having a second polarization direction and the emission light is output, the shutter panel including a first electrode, a second electrode connected to a fixed potential, a liquid crystal layer arranged between the first electrode and the second electrode, a drive circuit configured to apply, to the first electrode, any one of a first voltage changing a polarization direction of the emission light into the first polarization direction and a second voltage changing the polarization direction of the emission light into the second polarization direction, the drive circuit being configured to switch a voltage applied to the first electrode between the first voltage and the second voltage in synchronization with the display panel switching between a display of the left-eye image and a display of the right-eye image, a third electrode connected to the fixed potential and arranged on a side opposite to the liquid crystal layer with respect to the second electrode, and an insulating layer arranged between the second electrode and the third electrode.

Here, when the voltage applied to the first electrode changes between the first voltage and the second voltage, the potential of the second electrode changes from the fixed potential due to the wiring line or the like connected to the second electrode. At this time, the magnitude of the change in potential in the second electrode decreases as an electric capacitance formed between the second electrode and another conductive member increases. Therefore, according to the configuration described above, the second electrode and the third electrode are arranged via the insulating layer, so that an electric capacitance is formed between the second electrode and the third electrode. That is, in addition to the electric capacitance of the liquid crystal layer between the second electrode and the first electrode, an electric capacitance is also formed between the second electrode and the third electrode arranged on a side opposite to the liquid crystal layer with respect to the second electrode. Therefore, the electric capacitance formed between the second electrode and the other conductive member increases. Accordingly, it is possible to reduce the magnitude of the change in potential in the second electrode when the voltage applied to the first electrode changes. As a result, a change (blunting) in the waveform of the potential difference between the first electrode and the second electrode is reduced, and a change in the waveform of the voltage applied to the liquid crystal layer is reduced. Accordingly, a delay in the timing when the polarization direction of the light emitted from the shutter panel is switched with respect to the timing when the voltage applied to the first electrode is switched between the first voltage and the second voltage is prevented. The timing when the voltage applied to the first electrode is switched between the first voltage and the second voltage is synchronized with the timing (display timing) when the left-eye image and the right-eye image are switched, so that it is possible to prevent a delay in the timing when the polarization direction of light is changed by the shutter panel with respect to the display timing of the display panel.

BRIEF DESCRIPTION OF DRAWINGS

The disclosure will be described with reference to the accompanying drawings, wherein like numbers reference like elements.

DESCRIPTION OF EMBODIMENTS

Figure 1:
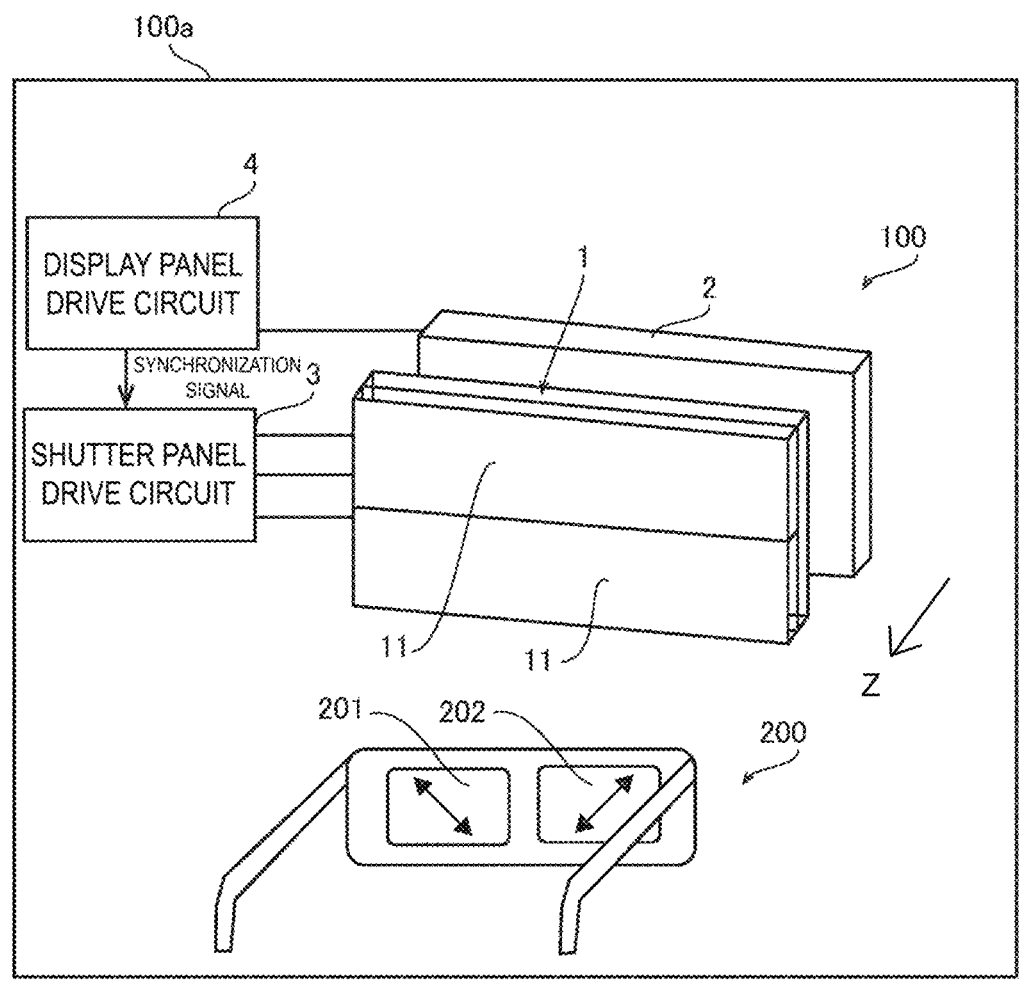
FIG. 1 is a schematic view illustrating a configuration of a stereoscopic display system 100a according to a first embodiment.

Embodiments of the disclosure will be described below with reference to the drawings. Note that the disclosure is not limited to the following embodiments, and appropriate design changes can be made within a scope that satisfies the configuration of the disclosure. In the description below, the same reference signs are used in common among the different drawings for portions having the same or similar functions, and repeated description thereof will be omitted. The configurations described in the embodiments and the modified examples may be combined or modified as appropriate within a range that does not depart from the gist of the disclosure. For ease of explanation, in the drawings referenced below, the configuration is simplified or schematically illustrated, or a portion of the components is omitted. Furthermore, dimensional ratios between components illustrated in the drawings are not necessarily indicative of actual dimensional ratios.

First Embodiment

FIG. 1 is a schematic view illustrating a configuration of a stereoscopic display system 100a according to a first embodiment. As illustrated in FIG. 1, the stereoscopic display system 100a includes a stereoscopic display device 100 and polarizing glasses 200. The stereoscopic display device 100 alternately switches and displays a left-eye image and a right-eye image.

A polarization direction of the left-eye image output from the stereoscopic display device 100 is different from a polarization direction of the right-eye image. For example, the polarization direction of the left-eye image is different from the polarization direction of the right-eye image by 90 degrees. In the first embodiment, one of the polarization direction of the left-eye image and the polarization direction of the right-eye image is −45 degrees and the other one is +45 degrees. However, one of the polarization directions of the left-eye image and the polarization direction of the right-eye image may be 0 degrees and the other one may be 90 degrees. A polarizing film 201 that transmits light in the polarization direction of the left-eye image and blocks light in the polarization direction of the right-eye image is arranged in a left-eye rim of the polarizing glasses 200. Furthermore, a polarizing film 202 that transmits light in the polarization direction of the right-eye image and blocks light in the polarization direction of the left-eye image is arranged in a right-eye rim of the polarizing glasses 200. That is, the stereoscopic display system 100*a* is an active retarder type stereoscopic image display system (3D image display system).

As illustrated in FIG. 1, the stereoscopic display device 100 includes a shutter panel 1, a display panel 2, a shutter panel drive circuit 3 (hereinafter referred to as "drive circuit 3"), and a display panel drive circuit 4 (hereinafter referred to as "drive circuit 4"). In FIG. 1, the shutter panel 1, the display panel 2, the drive circuit 3, and the drive circuit 4 are illustrated as being separated from each other for facilitating the description, but at least two components among the shutter panel 1, the display panel 2, the drive circuit 3, and the drive circuit 4 may be integrally arranged in contact with each other. For example, the shutter panel 1, the display panel 2, the drive circuit 3, and the drive circuit 4 may be arranged in a housing (not illustrated).

The display panel 2 alternately displays the left-eye image and the right-eye image. The polarization direction of the left-eye image output from the display panel 2 toward the shutter panel 1 is equal to the polarization direction of the right-eye image output from the display panel 2 toward the shutter panel 1. Further, the display panel 2 alternately displays the left-eye image and the right-eye image for each frame. Note that the display panel 2 is not limited to the present example, and may be configured to alternately display the left-eye image and the right-eye image every predetermined period (for a plurality of frames). The display panel 2 is configured as a liquid crystal display panel or an organic EL panel.

The drive circuit 4 supplies, to the display panel 2, drive signals (a gate signal and a source signal) to control the display panel 2 so as to drive the display panel 2. The drive circuit 4 updates an image on the display panel 2 at a predetermined display timing (refresh rate). Subsequently, the drive circuit 4 transmits a synchronization signal synchronized with the display timing to the drive circuit 3.

Configuration of Shutter Panel 1

Figure 2:
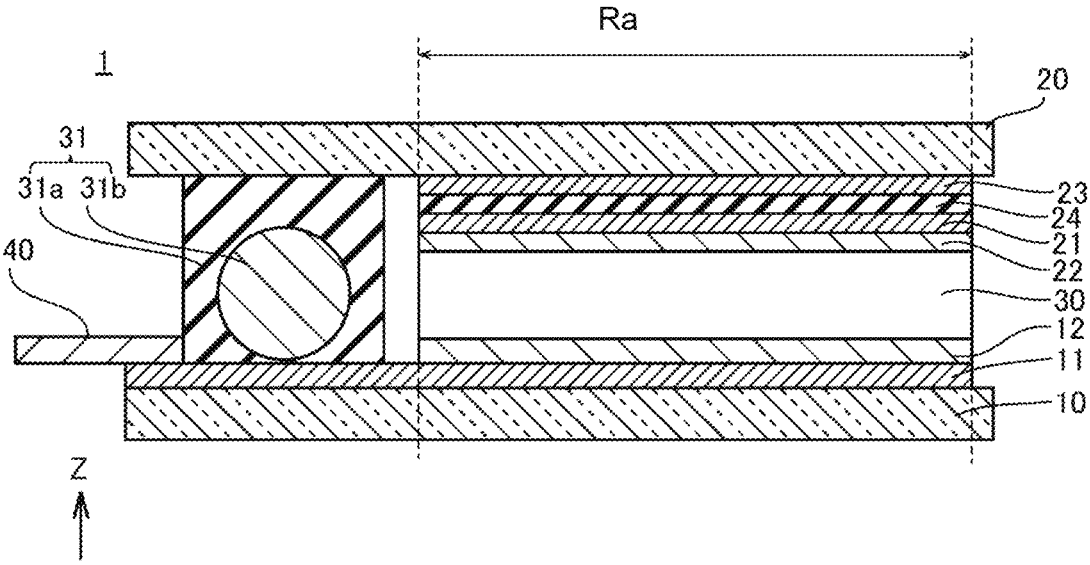
FIG. 2 is a cross-sectional view of a shutter panel 1 according to the first embodiment.
Figure 3:
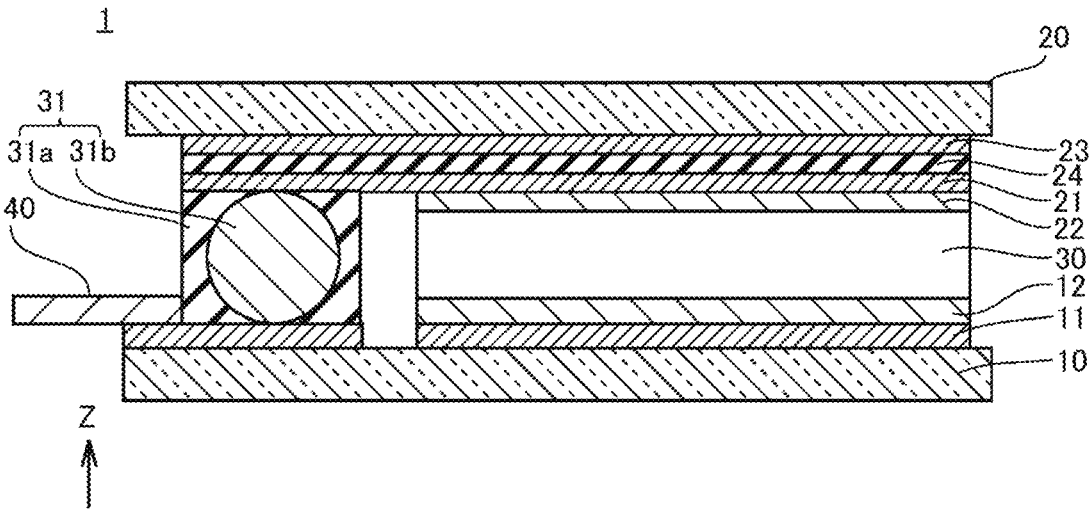
FIG. 3 is a cross-sectional view illustrating a configuration of a connection portion between a counter electrode 21 and a wiring line section 40 of the shutter panel 1 according to the first embodiment.
Figure 4:
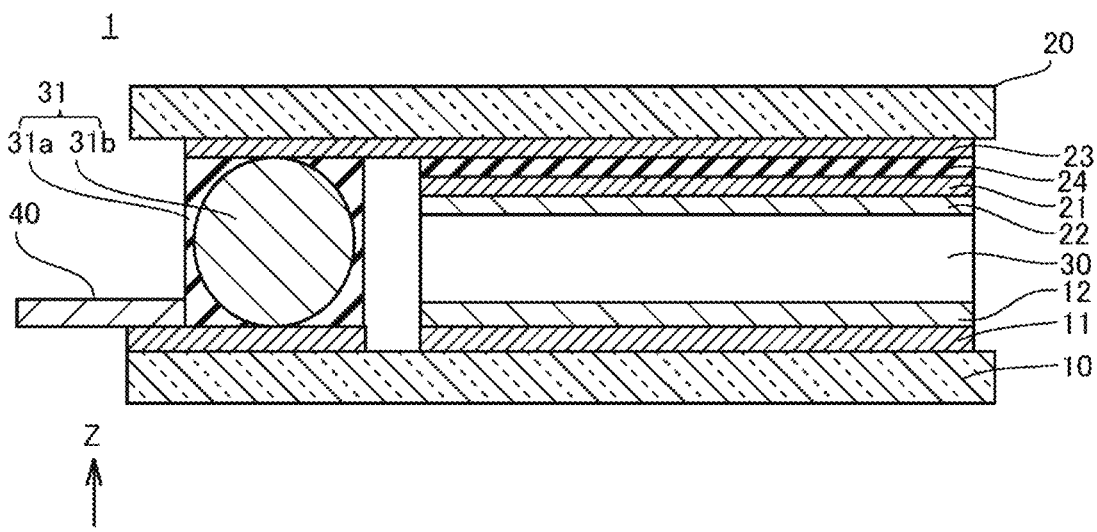
FIG. 4 is a cross-sectional view illustrating a configuration of a connection portion between an auxiliary electrode 23 and the wiring line section 40 of the shutter panel 1 according to the first embodiment.
Figure 5:
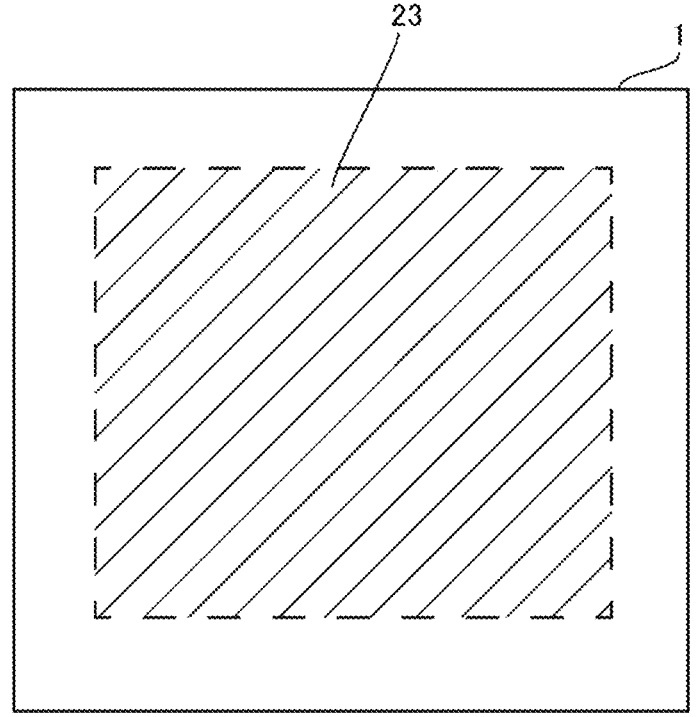
FIG. 5 is a plan view of the shutter panel 1 according to the first embodiment.

FIG. 2 is a cross-sectional view of the shutter panel 1 according to the first embodiment. FIG. 3 is a cross-sectional view illustrating a configuration of a connection portion between a counter electrode 21 and a wiring line section 40 of the shutter panel 1 according to the first embodiment. FIG. 4 is a cross-sectional view illustrating a configuration of a connection portion between an auxiliary electrode 23 and the wiring line section 40 of the shutter panel 1 according to the first embodiment. FIG. 5 is a plan view of the shutter panel 1 according to the first embodiment. The shutter panel 1 is a panel that switches between a state where light incident from the display panel 2 is changed into emission light having a polarization direction of −45 degrees and the emission light is output and a state where light incident from the display panel 2 is changed into emission light having a polarization direction of +45 degrees and the emission light is output. The shutter panel 1 includes a first substrate 10 and a second substrate 20 arranged to face the first substrate 10. The shutter panel 1 includes a plurality of segment electrodes 11, an alignment film 12, the counter electrode 21, an alignment film 22, the auxiliary electrode 23, an insulating layer 24, a liquid crystal layer 30, a sealing section 31, and the wiring line section 40. The wiring line section 40 is, for example, a flexible printed circuit board, and a plurality of wiring lines (not illustrated) are provided therein. For example, the first substrate 10 and the second substrate 20 include a glass substrate or a resin substrate that transmits light.

As illustrated in FIG. 2, the plurality of segment electrodes 11 are arranged on the first substrate 10. The plurality of segment electrodes 11 are connected to the drive circuit 3 via the wiring line section 40. The alignment film 12 covers a region Ra (see FIG. 5) of the plurality of segment electrodes 11 where light from the display panel 2 is transmitted and light is emitted from the shutter panel 1. The alignment film 12 is arranged between the plurality of segment electrodes 11 and the liquid crystal layer 30. The alignment film 12 transmits light in a predetermined polarization direction. For example, the plurality of segment electrodes 11 are formed of a transparent conductive material such as indium tin oxide (ITO) and indium zinc oxide (IZO). The plurality of segment electrodes 11 may be formed of a metal conductive material formed in a mesh shape.

As illustrated in FIG. 3, the counter electrode 21 is arranged on the second substrate 20. The counter electrode 21 is arranged at a position overlapping the plurality of segment electrodes 11 in a plan view of the shutter panel 1 (viewed in the Z direction). The counter electrode 21 is connected, via the sealing section 31 (common transition) arranged between the first substrate 10 and the second substrate 20, to the wiring line section 40, a part of which is arranged on the first substrate 10. The sealing section 31 includes a sealing member 31*a* that seals the liquid crystal layer 30 between the first substrate 10 and the second substrate 20, and conductive beads 31*b* contained in the sealing member 31*a*. The counter electrode 21 is connected, via the conductive beads 31*b*, to the wiring line section 40 arranged on the first substrate 10 side. The counter electrode 21 is connected, via the wiring line section 40, to the ground (GND) having a fixed potential. The alignment film 22 covers the region Ra (see FIG. 5) of the counter electrode 21. The alignment film 22 is arranged between the counter electrode 21 and the liquid crystal layer 30. The alignment film 22 transmits light in a predetermined polarization direction. The counter electrode 21 is arranged to face the plurality of segment electrodes 11 via the liquid crystal layer 30. For example, the counter electrode 21 is formed of a transparent conductive material such as indium tin oxide (ITO) and indium zinc oxide (IZO). The counter electrode 21 may be formed of a metal conductive material formed in a mesh shape.

In the first embodiment, as illustrated in FIG. 4, the auxiliary electrode 23 is arranged at a position in the Z direction from the counter electrode 21. That is, the auxiliary electrode 23 is arranged on a side opposite to the liquid crystal layer 30 with respect to the counter electrode 21. The auxiliary electrode 23 is arranged between the counter electrode 21 and the second substrate 20. The insulating layer 24 is arranged between the counter electrode 21 and the auxiliary electrode 23 in the normal direction. Thus, the auxiliary electrode 23 is arranged to face the counter electrode 21 via the insulating layer 24. For example, the auxiliary electrode 23 is arranged so as to cover the region Ra (see FIG. 5). The auxiliary electrode 23 is connected, via the sealing section 31 (common transition) arranged between the first substrate 10 and the second substrate 20, to the wiring line section 40, a part of which is arranged on the first substrate 10. The auxiliary electrode 23 is connected to the ground (GND) via the wiring line section 40. For example, the auxiliary electrode 23 is formed of a transparent conductive material such as indium tin oxide (ITO) and indium zinc oxide (IZO). The auxiliary electrode 23 may be formed of a metal conductive material formed in a mesh shape. The insulating layer 24 is formed of an insulating inorganic film or an insulating organic film.

Figure 6:
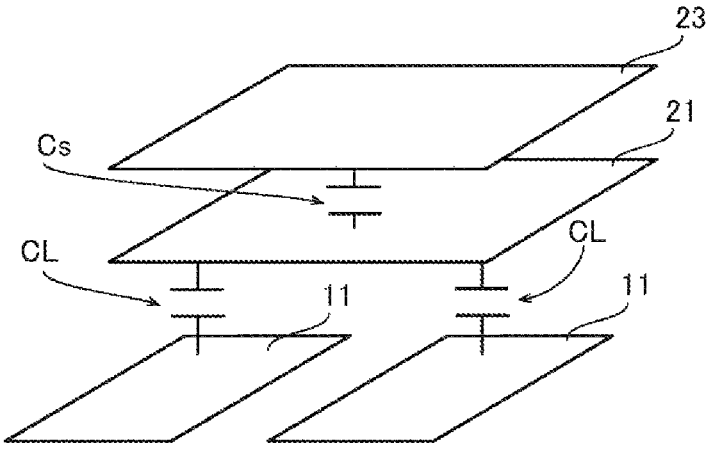
FIG. 6 is a schematic view for explaining electric capacitances Cs and CL.
Figure 7:
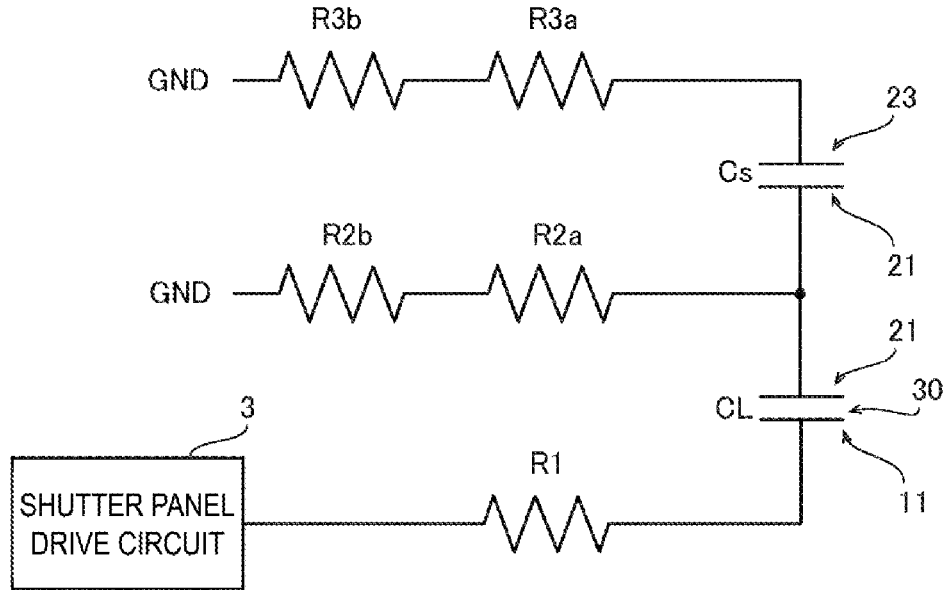
FIG. 7 is a circuit diagram schematically illustrating an electrical relationship among segment electrodes 11, the counter electrode 21, and the auxiliary electrode 23.

FIG. 6 is a schematic view for explaining electric capacitances Cs and CL. FIG. 7 is a circuit diagram schematically illustrating an electrical relationship among the segment electrodes 11, the counter electrode 21, and the auxiliary electrode 23. As illustrated in FIG. 7, a wiring line resistance R1 is formed between the segment electrodes 11 and the drive circuit 3. A wiring line resistance R2a and a resistance R2b from common transition are formed between the counter electrode 21 and the ground (GND). A wiring line resistance R3a and a resistance R3b from common transition are formed between the auxiliary electrode 23 and the ground (GND). As illustrated in FIG. 6, the counter electrode 21 forms the electric capacitance CL with each of the plurality of segment electrodes 11. The electric capacitance Cs is formed between the auxiliary electrode 23 and the counter electrode 21.

Here, as described later, when a state where a drive voltage V1H is applied to the segment electrodes 11 changes to a state where the drive voltage V1H is not applied (overshoot voltage V2os), the potential of the counter electrode 21 changes from the ground potential, due to the sealing section 31, the wiring line section 40, and the like connected to the counter electrode 21. At this time, the magnitude of the change in potential in the counter electrode 21 is smaller when the electric capacitance formed between the counter electrode 21 and the other electrodes is greater. Therefore, according to the above-described configuration, the counter electrode 21 and the auxiliary electrode 23 are arranged via the insulating layer 24, and thus, the electric capacitance Cs is formed between the counter electrode 21 and the auxiliary electrode 23. That is, in addition to the electric capacitance CL, the electric capacitance Cs is formed so that the electric capacitance formed between the counter electrode 21 and the other conductive member increases. Accordingly, it is possible to reduce the magnitude of the change in potential in the counter electrode 21 when a voltage value of the voltage applied to the segment electrodes 11 changes. As a result, the change (blunting) of the waveform of the potential difference between the segment electrodes 11 and the counter electrode 21 is reduced, and the change of the waveform of the voltage applied to the liquid crystal layer 30 is reduced. This prevents a delay in the timing when the polarization direction of the light emitted from the shutter panel 1 is switched with respect to the timing when the voltage applied to the segment electrodes 11 is switched. The timing when the voltage applied to the segment electrodes 11 is switched is synchronized with the timing (display timing) when the left-eye image and the right-eye image are switched, so that it is possible to prevent a delay in the timing when the polarization direction of light is changed by the shutter panel 1 with respect to the display timing of the display panel 2.

Configuration of Shutter Panel Drive Circuit 3

Figure 8:
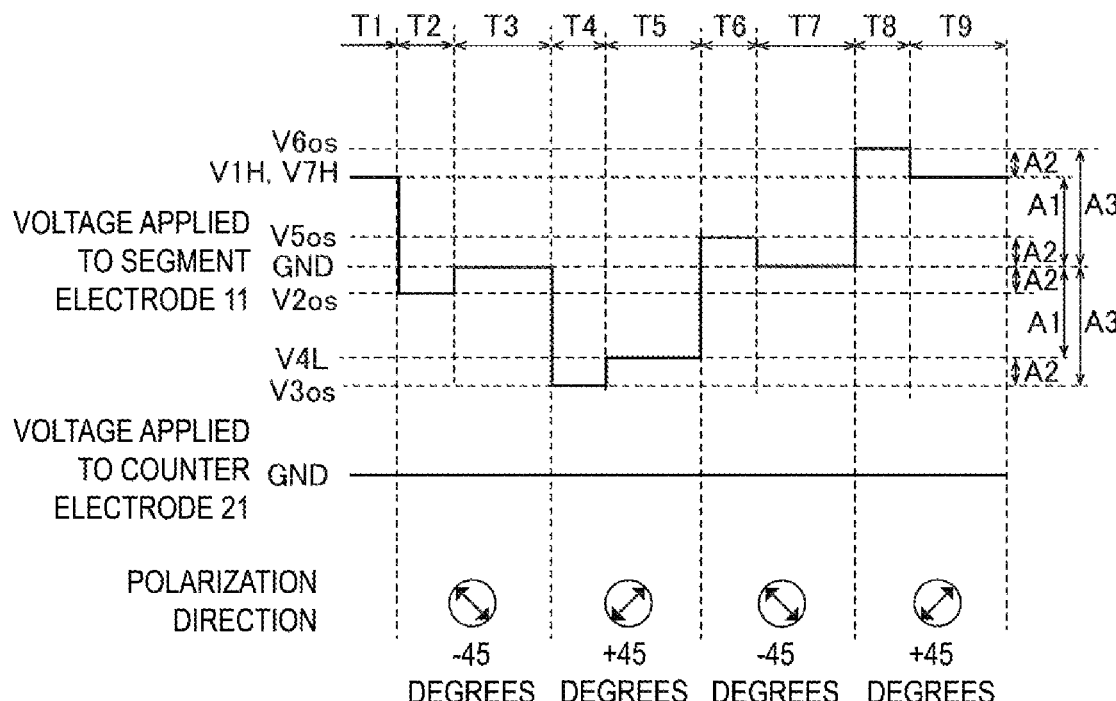
FIG. 8 is a timing diagram for explaining a relationship between a voltage applied to the segment electrodes 11 and a polarization direction of light emitted from the shutter panel 1.
Figure 9:
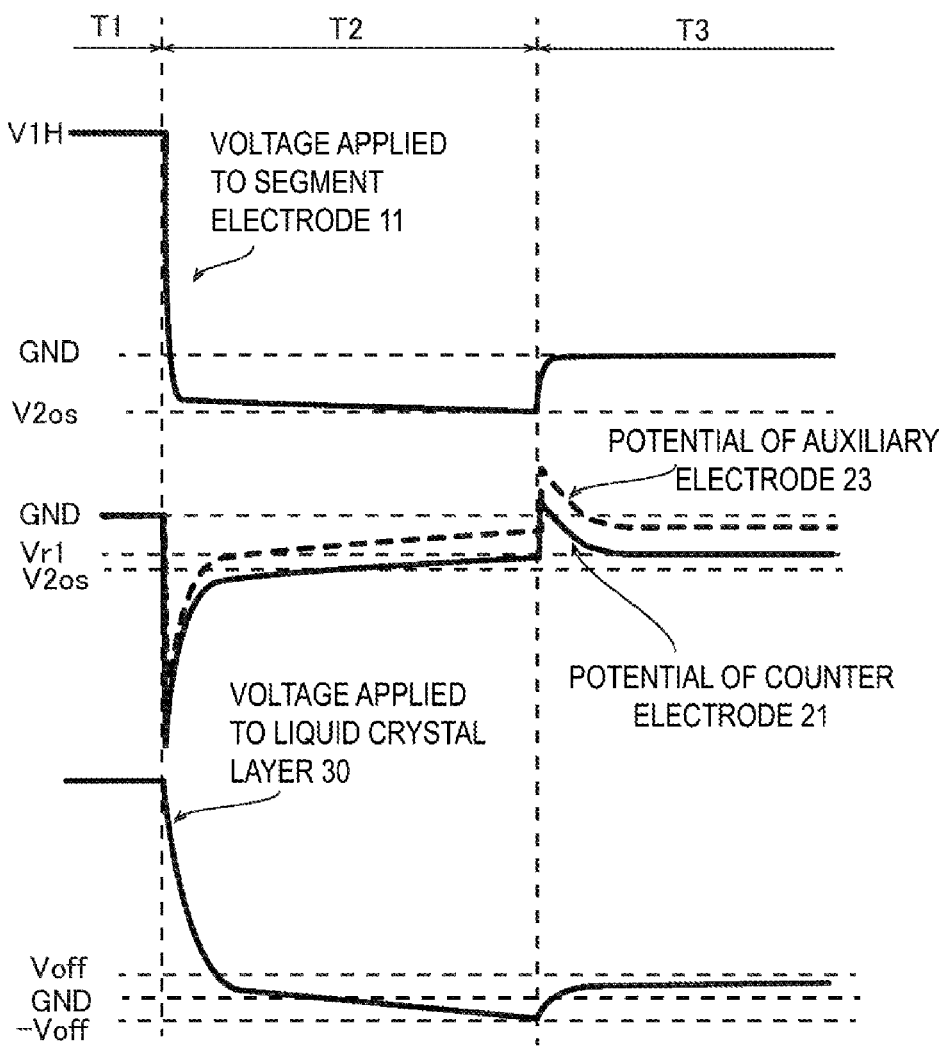
FIG. 9 is a graph illustrating waveforms of voltages applied to the segment electrodes 11, the counter electrode 21, the auxiliary electrode 23, and a liquid crystal layer 30 from a period T1 to a period T3.
Figure 10:
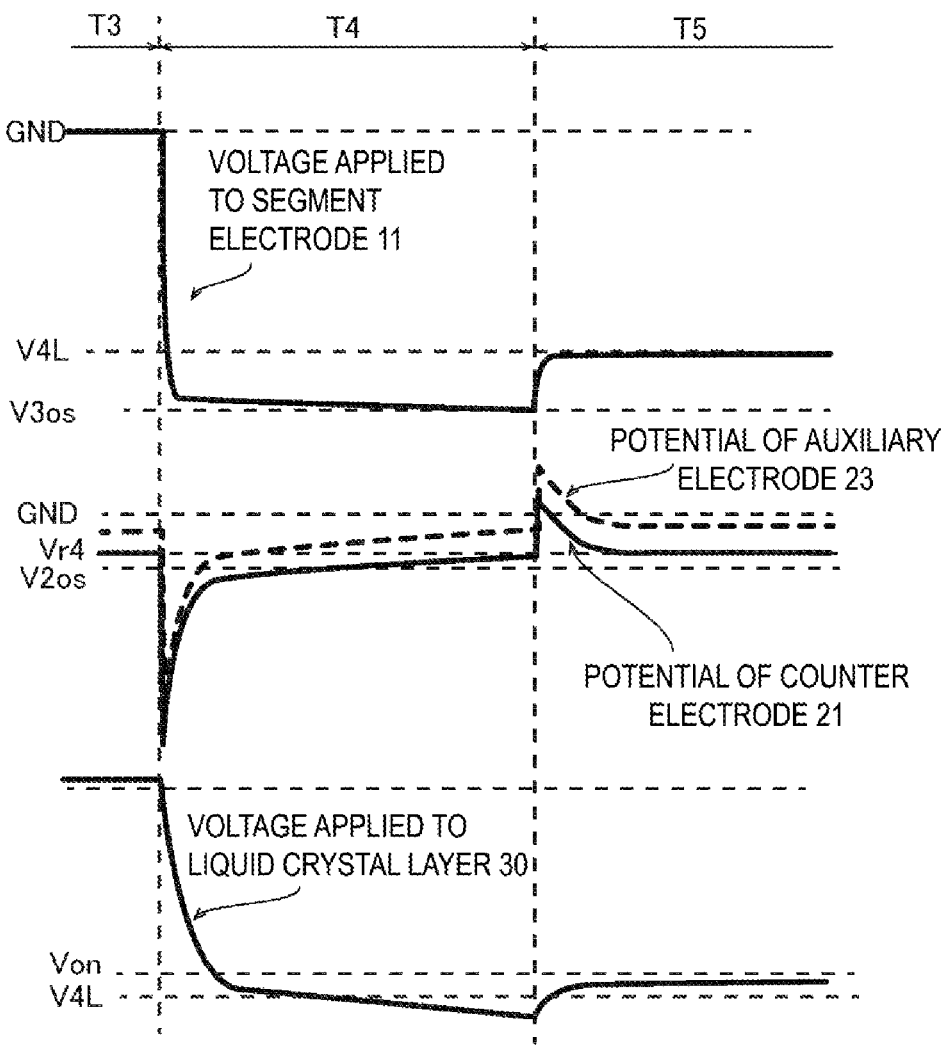
FIG. 10 is a graph illustrating waveforms of voltages applied to the segment electrodes 11, the counter electrode 21, the auxiliary electrode 23, and the liquid crystal layer 30 from the period T3 to a period T5.
Figure 11:
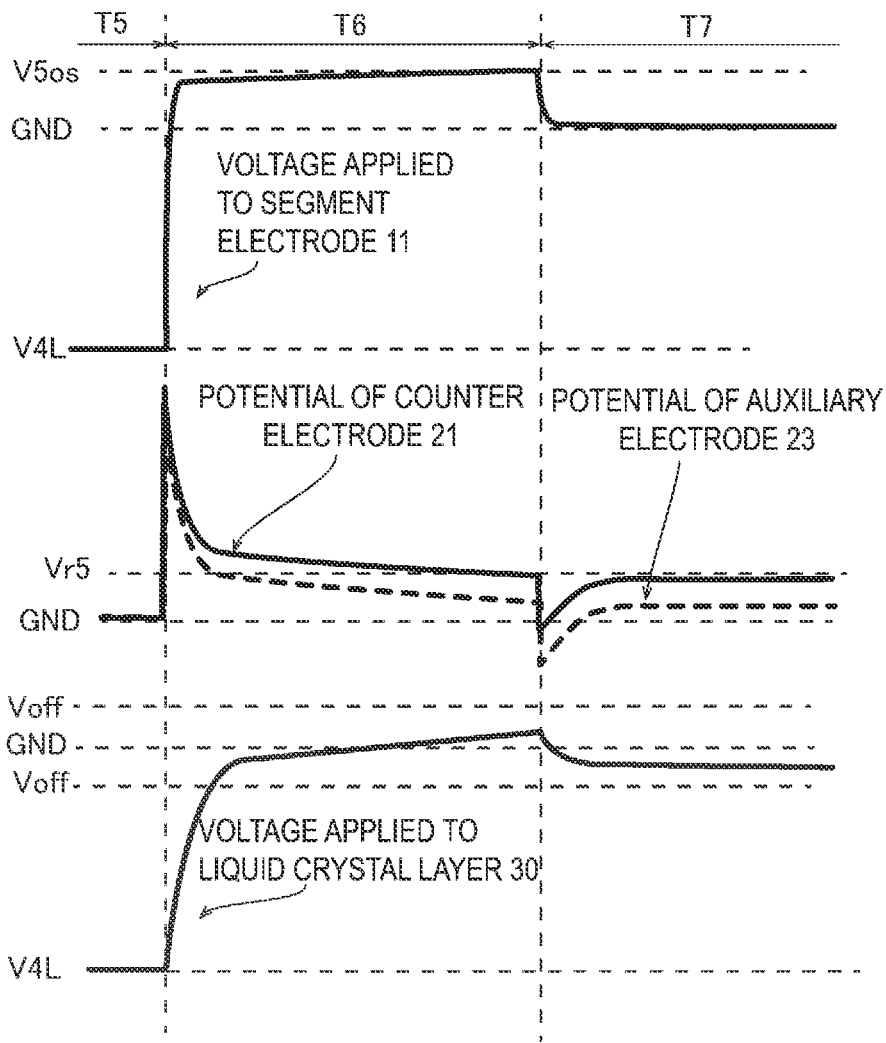
FIG. 11 is a graph illustrating waveforms of voltages applied to the segment electrodes 11, the counter electrode 21, the auxiliary electrode 23, and the liquid crystal layer 30 from the period T5 to a period T7.
Figure 12:
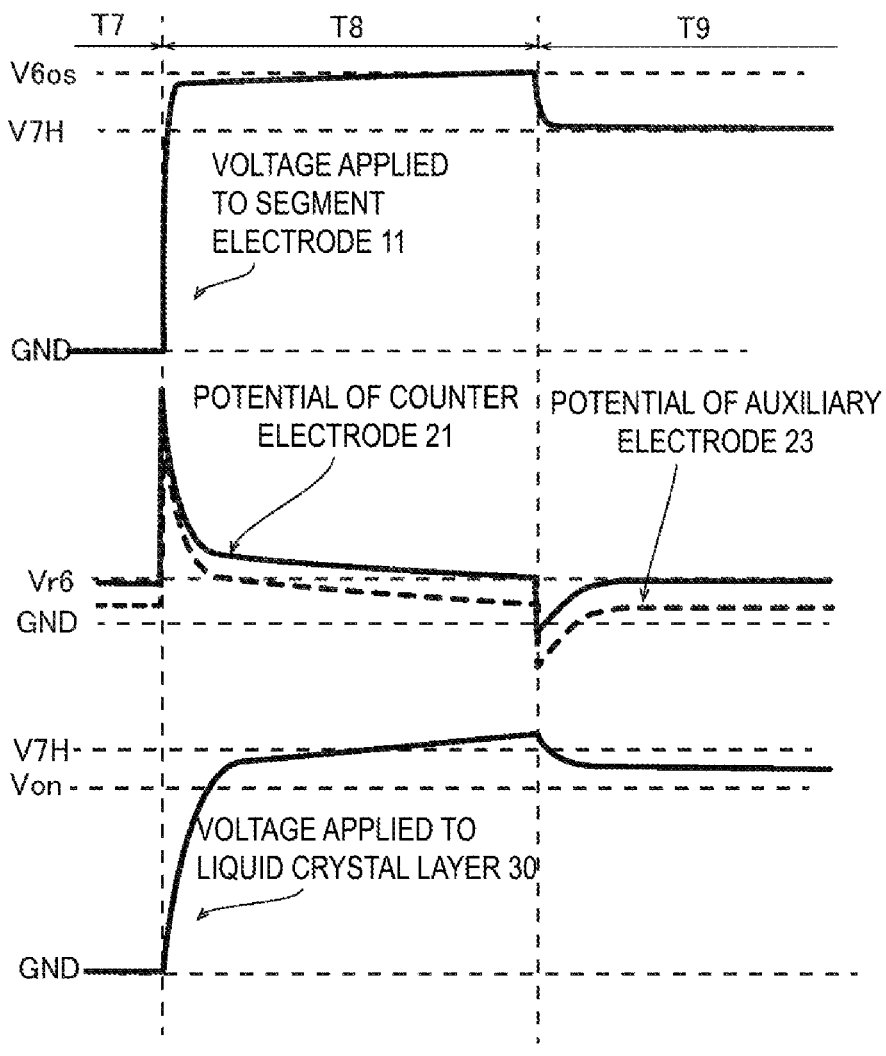
FIG. 12 is a graph illustrating waveforms of voltages applied to the segment electrodes 11, the counter electrode 21, the auxiliary electrode 23, and the liquid crystal layer 30 from the period T7 to a period T9.

FIG. 8 is a timing diagram for explaining a relationship between the voltage applied to the segment electrodes 11 and the polarization direction of light emitted from the shutter panel 1. FIG. 9 is a graph illustrating waveforms of voltages applied to the segment electrodes 11, the counter electrode 21, the auxiliary electrode 23, and the liquid crystal layer 30 from a period T1 to a period T3. FIG. 10 is a graph illustrating waveforms of voltages applied to the segment electrodes 11, the counter electrode 21, the auxiliary electrode 23, and the liquid crystal layer 30 from the period T3 to a period T5. FIG. 11 is a graph illustrating waveforms of voltages applied to the segment electrodes 11, the counter electrode 21, the auxiliary electrode 23, and the liquid crystal layer 30 from the period T5 to a period T7. FIG. 12 is a graph illustrating waveforms of voltages applied to the segment electrodes 11, the counter electrode 21, the auxiliary electrode 23, and the liquid crystal layer 30 from the period T7 to a period T9. In FIG. 8, for facilitating the description, the waveforms of the voltages are simplified and illustrated as a rectangular waveform.

As illustrated in FIG. 8, the drive circuit 3 applies a voltage to the segment electrodes 11 so that the polarization direction of the light emitted from the shutter panel 1 is −45 degrees in the periods in which the display panel 2 displays the left-eye image (periods T2, T3, T6, and T7 in FIG. 8). For example, the drive circuit 3 applies the overshoot voltage V2os to the plurality of segment electrodes 11 in the period T2, applies the ground voltage (GND) to the plurality of segment electrodes 11 in the periods T3 and T7, and applies an overshoot voltage V5os to the plurality of segment electrodes 11 in the period T6, so that absolute values of the voltages applied to the liquid crystal layer 30 are equal to or smaller than an OFF threshold value Voff (see FIGS. 9 and 11). The drive circuit 3 applies a voltage to the segment electrodes 11 so that the polarization direction of the light emitted from the shutter panel 1 is +45 degrees in the periods in which the display panel 2 displays the right-eye image (periods T1, T4, T5, T8, and T9 in FIG. 8). For example, the drive circuit 3 applies, to the plurality of segment electrodes 11, the drive voltage V1H in the period T1, an overshoot voltage V3os in the period T4, a drive voltage V4L in the period T5, an overshoot voltage V6os in the period T8, and a drive voltage V7H in the period T9, so that the absolute values of the voltages applied to the liquid crystal layer 30 are equal to or greater than an ON threshold value Von. Accordingly, the light of the left-eye image having a polarization direction of −45 degrees emitted from the shutter panel 1 is transmitted through the polarizing film 201 of the polarizing glasses 200, and the light of the right-eye image having a polarization direction of +45 degrees is transmitted through the polarizing film 202 of the polarizing glasses 200. The drive circuit 3 repeatedly performs operations of the periods T1 to T9, so that the drive voltages V1H, V4L, and V7H are periodically applied to the segment electrodes 11, and the overshoot voltages V2os, V3os, V5os, and V6os are periodically applied to the segment electrodes 11. As a result, a viewer wearing the polarizing glasses 200 can view a stereoscopic image (stereoscopic moving image).

As illustrated in FIG. 9, the drive circuit 3 supplies the drive voltage V1H to the segment electrodes 11 during the period T1. The drive voltage V1H is a positive voltage with respect to the ground (GND). The drive circuit 3 applies the overshoot voltage V2os having negative polarity to the segment electrodes 11 in the period T2 after the period T1. The overshoot voltage V2os has an absolute value A2 of the voltage value smaller than an absolute value A1 of the voltage value of the drive voltage V1H (see FIG. 8). As the potential of the segment electrodes 11 decreases, the potential of the counter electrode 21 changes to the negative polarity. However, the electric capacitance Cs is formed between the counter electrode 21 and the auxiliary electrode 23, and thus, the amount of the potential change in the counter electrode 21 is reduced. As a result, it is possible to prevent an increase in the time constant of the voltage applied to the liquid crystal layer 30. The overshoot voltage V2os having negative polarity is applied to the segment electrodes 11 during the period T2, and thus, the potential difference between the segment electrodes 11 and the counter electrode 21 can be reduced more quickly than in the case where the ground voltage is applied to the segment electrodes 11. As a result, the voltage applied to the liquid crystal layer 30 reaches the OFF threshold value Voff or a lower value more quickly, and thus, it is possible to prevent a delay in the timing when the polarization direction of light is changed by the shutter panel 1 with respect to the display timing of the display panel 2 (it is possible to shorten the delay time).

In the period T2, the absolute value of the voltage applied to the liquid crystal layer 30 changes from a value greater than the OFF threshold value Voff to a value equal to or smaller than the OFF threshold value Voff. At this time, the polarization direction of the light emitted from the shutter panel 1 changes from +45 degrees to −45 degrees. In the period T2, the voltage value applied to the liquid crystal layer 30 changes from a value greater than the ground voltage to a value lower than the ground voltage. The drive circuit 3 supplies the ground voltage to the segment electrodes 11 in the period T3 after the period T2.

In the period T3 after the period T2, the potential of the counter electrode 21 is a potential (a residual potential Vr1) represented by Equation (1) below.

$$|Vr1| = |V1H*CL/(CL+Cs)| \tag{1}$$

Therefore, in the first embodiment, the thickness of each of the counter electrode 21, the auxiliary electrode 23, and the insulating layer 24 and the distances therebetween are set so that the absolute value of the residual potential Vr1 is smaller than the absolute value of the OFF threshold value Voff in each of the counter electrode 21, the auxiliary electrode 23, and the insulating layer 24. The counter electrode 21, the auxiliary electrode 23, and the insulating layer 24 are configured so that the electric capacitance Cs between the counter electrode 21 and the auxiliary electrode 23 satisfies Expression (2) below. Accordingly, a state where the absolute value of the voltage value applied to the liquid crystal layer 30 does not exceed the OFF threshold value Voff is maintained.

$$Cs > (|V1H*CL|/|Voff|) - CL \tag{2}$$

As illustrated in FIG. 10, in the period T4 after the period T3, the drive circuit 3 applies, to the segment electrodes 11, the overshoot voltage V3*os* having a polarity (negative polarity) different from that of the drive voltage V1H. In the period T4, a state where the absolute value of the voltage applied to the liquid crystal layer 30 is smaller than the ON threshold value Von changes to a state where the absolute value of the voltage applied to the liquid crystal layer 30 is equal to or greater than the ON threshold value Von. At this time, the polarization direction of the light emitted from the shutter panel 1 changes from −45 degrees to +45 degrees. In the period T4, the absolute value of the voltage value applied to the liquid crystal layer 30 changes from a value smaller than the absolute value (amplitude) of the voltage value of the drive voltage V1H (the drive voltage V4L described later) to a value greater than the absolute value (amplitude) of the voltage value of the drive voltage V1H.

In the period T5 after the period T4, the drive circuit 3 applies the drive voltage V4L having negative polarity to the segment electrodes 11. For example, as illustrated in FIG. 8, the absolute value of the voltage value of the drive voltage V4L is equal to the absolute value A1 of the voltage value of the drive voltage V1H. The absolute value of the voltage value of the overshoot voltage V3*os* is a value A3 that is greater than the absolute value A1 of the voltage values of the drive voltage V1H and the drive voltage V4L. The difference between the absolute value of the voltage value of the overshoot voltage V3*os* and the absolute value of the voltage value of a voltage V2L is equal to the magnitude of the value A2.

As illustrated in FIG. 10, in the period T5, the potential of the counter electrode 21 is a potential (a residual potential Vr4) represented by Equation (3) below.

$$|Vr4| = |V4L*CL/(CL+Cs)| \tag{3}$$

Therefore, in the first embodiment, the thickness of each of the counter electrode 21, the auxiliary electrode 23, and the insulating layer 24 and the distances therebetween are set so that the absolute value of the residual potential Vr4 is smaller than the absolute value of a difference value between the drive voltage V4L and the ON threshold value Von in each of the counter electrode 21, the auxiliary electrode 23, and the insulating layer 24. The counter electrode 21, the auxiliary electrode 23, and the insulating layer 24 are configured so that the electric capacitance Cs between the counter electrode 21 and the auxiliary electrode 23 satisfies Expression (4) below. That is, the electric capacitance Cs between the counter electrode 21 and the auxiliary electrode 23 satisfies Expression (2) above and also satisfies Expression (4). Accordingly, a state where the absolute value of the voltage value applied to the liquid crystal layer 30 is not lower than the ON threshold value Von is maintained.

$$Cs > \{|V4L*CL|/(|V4L|-|Von|)\} - CL \tag{4}$$

As illustrated in FIG. 11, in the period T6 after the period T5, the drive circuit 3 applies, to the segment electrodes 11, the overshoot voltage V5*os* having a polarity (positive polarity) different from that of the drive voltage V4L. In the period T6, a state where the absolute value of the voltage applied to the liquid crystal layer 30 is greater than the OFF threshold value Voff is changed to a state where the absolute value of the voltage applied to the liquid crystal layer 30 is equal to or smaller than the OFF threshold value Voff. At this time, the polarization direction of the light emitted from the shutter panel 1 changes from +45 degrees to −45 degrees. In the period T6, the absolute value of the voltage value applied to the liquid crystal layer 30 changes from a value lower than the ground potential (GND) to a value greater than the ground potential.

In the period T7 after the period T6, the drive circuit 3 applies the ground voltage to the segment electrodes 11. In the period T7, the potential of the counter electrode 21 is a potential (a residual potential Vr5) represented by Equation (5).

$$|Vr5| = |V4L*CL/(CL+Cs)| \tag{5}$$

Therefore, in the first embodiment, the thickness of each of the counter electrode 21, the auxiliary electrode 23, and the insulating layer 24 and the distances therebetween are set so that the absolute value of the residual potential Vr5 is smaller than the absolute value of a difference value between the drive voltage V4L and the OFF threshold value Voff in the counter electrode 21, the auxiliary electrode 23, and the insulating layer 24. The counter electrode 21, the auxiliary electrode 23, and the insulating layer 24 are configured so that the electric capacitance Cs between the counter electrode 21 and the auxiliary electrode 23 satisfies Expression (6) below. That is, the electric capacitance Cs between the counter electrode 21 and the auxiliary electrode 23 satisfies the above-described Expressions (2) and (4), and Expression (6).

$$Cs > (|V4L*CL|/|Voff|) - CL \tag{6}$$

As illustrated in FIG. 12, in the period T8 after the period T7, the drive circuit 3 applies the overshoot voltage V6*os* having positive polarity to the segment electrodes 11. In the period T8, a state where the absolute value of the voltage applied to the liquid crystal layer 30 is smaller than the ON threshold value Von changes to a state where the absolute value of the voltage applied to the liquid crystal layer 30 is equal to or greater than the ON threshold value Von. At this time, the polarization direction of the light emitted from the shutter panel 1 changes from +45 degrees to −45 degrees. In the period T8, the absolute value of the voltage value applied to the liquid crystal layer 30 changes from a value smaller than the absolute value (amplitude) of the voltage value of the drive voltage V7H to a value greater than the absolute value (amplitude) of the voltage value of the drive voltage V7H.

In the period T9 after the period T8, the drive circuit 3 applies the drive voltage V7H having negative polarity to the segment electrodes 11. For example, as illustrated in FIG. 8, the absolute value of the voltage value of the drive voltage V7H is equal to the absolute value A1 of the voltage value of the drive voltage V1H. The absolute value of the voltage value of the overshoot voltage V6*os* is the value A3 that is greater than the absolute value A1 of the voltage value of the drive voltage V7H. The difference between the absolute value of the voltage value of the overshoot voltage V6*os* and the absolute value of the voltage value of the drive voltage V7H is equal to the magnitude of the value A2.

As illustrated in FIG. 12, in the period T9, the potential of the counter electrode 21 is a potential (a residual potential Vr6) represented by Equation (7) below.

$$|Vr6|=|V7H*CL/(CL+Cs)| \qquad (7)$$

Therefore, in the first embodiment, the thickness of each of the counter electrode 21, the auxiliary electrode 23, and the insulating layer 24 and the distances therebetween are set so that the absolute value of the residual potential Vr6 is smaller than the absolute value of a difference value between the drive voltage V7H and the ON threshold value Von in the counter electrode 21, the auxiliary electrode 23, and the insulating layer 24. The counter electrode 21, the auxiliary electrode 23, and the insulating layer 24 are configured so that the electric capacitance Cs between the counter electrode 21 and the auxiliary electrode 23 satisfies Expression (8) below. That is, the electric capacitance Cs between the counter electrode 21 and the auxiliary electrode 23 satisfies the above-described Expressions (2), (4), and (6), and Expression (8). Accordingly, a state where the absolute value of the voltage value applied to the liquid crystal layer 30 is not lower than the ON threshold value Von is maintained.

$$Cs>\{|V7H*CL|/(|V7H|-|Von|)\}-CL \qquad (8)$$

The drive circuit 3 repeatedly performs the operations of the periods T1 to T9 described above. As a result, the stereoscopic display device 100 can output an image while preventing a delay in the timing when the polarization direction of light is changed by the shutter panel 1 with respect to the display timing of the display panel 2.

Second Embodiment

Figure 13:
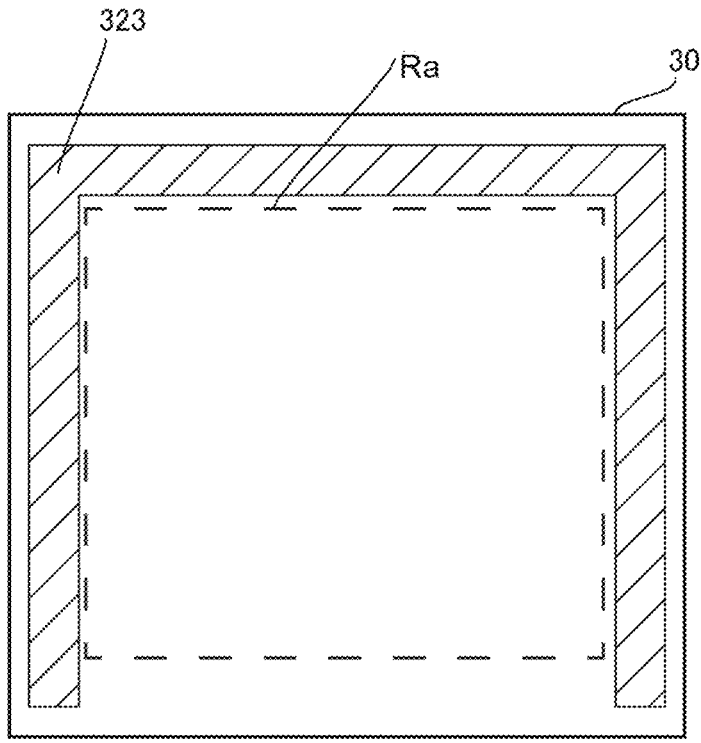
FIG. 13 is a plan view of a shutter panel 301 according to a second embodiment.
Figure 14:
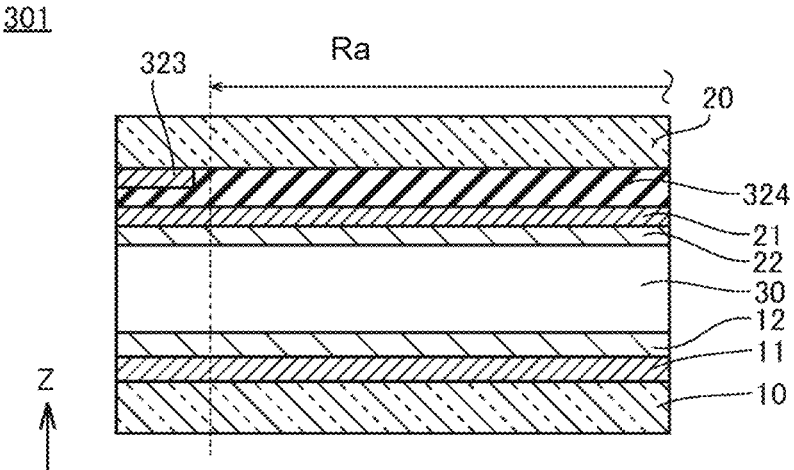
FIG. 14 is a cross-sectional view of the shutter panel 301 according to the second embodiment.

Next, a configuration of a shutter panel 301 according to a second embodiment will be described with reference to FIGS. 13 and 14. Constituents that are the same as those in the first embodiment are denoted by the same reference signs, and description thereof will be omitted. FIG. 13 is a plan view of the shutter panel 301 according to the second embodiment. FIG. 14 is a cross-sectional view of the shutter panel 301 according to the second embodiment.

As illustrated in FIG. 13, the shutter panel 301 according to the second embodiment includes an auxiliary electrode 323. The auxiliary electrode 323 is arranged outside the region Ra where the shutter panel 301 emits light in a plan view. For example, the auxiliary electrode 323 is arranged in a frame region. Thus, according to the second embodiment, it is possible to prevent the auxiliary electrode 323 from blocking light from the display panel 2. The auxiliary electrode 323 is formed in a U-shape in a plan view. For example, a wiring line section (not illustrated) is arranged at a base of the U-shaped auxiliary electrode 323 (on a lower side of a sheet surface in FIG. 13). For example, the auxiliary electrode 323 is formed of a metal material.

As illustrated in FIG. 14, the auxiliary electrode 323 is arranged to face the counter electrode 21 via an insulating layer 324. Thus, similarly to the first embodiment, an electric capacitance is formed between the auxiliary electrode 323 and the counter electrode 21. Other configurations and effects are similar to the configurations and effects in the first embodiment.

Third Embodiment

Next, a configuration of a stereoscopic display device 400 according to a third embodiment will be described with reference to FIGS. 15 and 16. Constituents that are the same as those in the first or second embodiment are denoted by the same reference signs, and description thereof will be omitted. FIG. is a schematic view of a stereoscopic display device according to the third embodiment. FIG. 16 is a timing diagram of voltages applied to the segment electrodes 11 from a drive circuit 403 according to the third embodiment.

Figure 15:
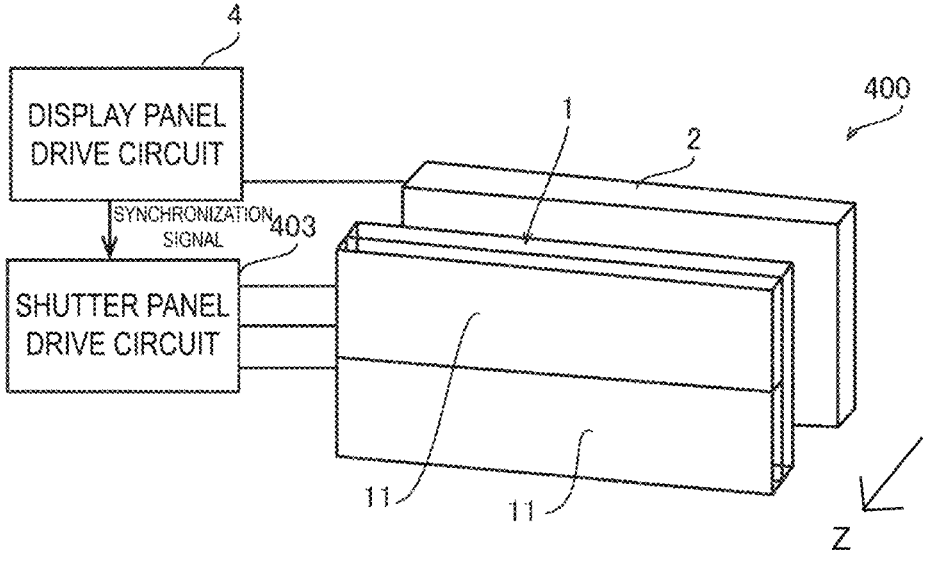
FIG. 15 is a schematic view of a stereoscopic display device according to a third embodiment.
Figure 16:
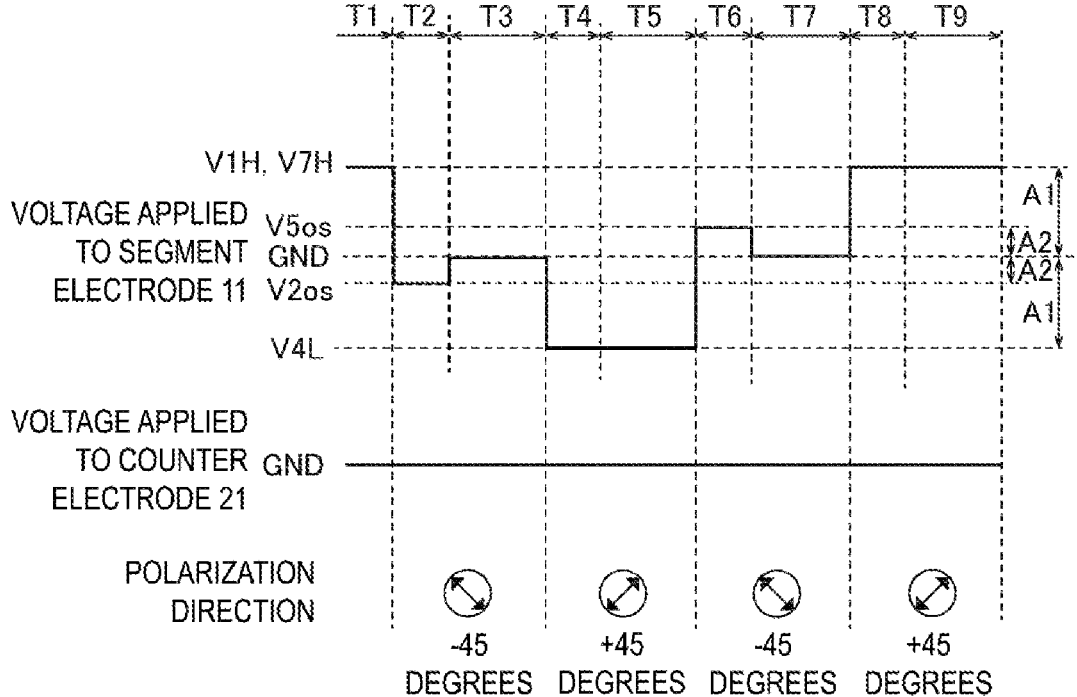
FIG. 16 is a timing diagram of voltages applied to the segment electrodes 11 from a drive circuit 403 according to the third embodiment.

As illustrated in FIG. 15, the stereoscopic display device 400 includes a shutter panel drive circuit 403. As illustrated in FIG. 16, unlike the shutter panel drive circuit 3 according to the first embodiment, the shutter panel drive circuit 403 applies the drive voltage V4L without applying an overshoot voltage to the segment electrodes 11 in the period T4, and applies the drive voltage V7H without applying an overshoot voltage to the segment electrodes 11 in the period T8.

Here, a response speed of the liquid crystal layer when changing from a state where the voltage difference in the liquid crystal layer is equal to or greater than the ON threshold value (ON state) to a state where the voltage difference is equal to or smaller than the OFF threshold value (OFF state) is lower than a response speed of the liquid crystal layer when changing from the OFF state to the ON state (the time constant increases). Therefore, when there is no problem of delay in the timing when the polarization direction of the light is changed by the shutter panel 1 with respect to the display timing of the display panel 2 when changing from the OFF state to the ON state, according to the configuration of the third embodiment, it is not necessary to generate a voltage having an absolute value of the voltage value greater than the absolute value A1 of the voltage value of the drive voltages V1H and V7H. Thus, it is possible to simplify the configuration of the shutter panel drive circuit 403. Other configurations and effects are similar to the configurations and effects in the first or second embodiment.

MODIFIED EXAMPLES

Although embodiments of the disclosure have been described above, the embodiments described above are merely examples for implementing the disclosure. Thus, the disclosure is not limited to the embodiments described above, and can be implemented by appropriately modifying the embodiments described above without departing from the scope. Now, modified examples of the above-described embodiments will be described.

(1) In the first and second embodiments described above, an example in which the counter electrode and the auxiliary electrode are connected to the ground (GND) is described. However, the disclosure is not limited thereto. That is, a predetermined voltage having a potential (fixed potential) other than the ground (GND) may be applied from the drive circuit to the counter electrode and the auxiliary electrode, without connecting the counter electrode and the auxiliary electrode to the ground (GND).

(2) In the first and second embodiments described above, examples in which a ground voltage is applied to the segment electrodes is described. However, the disclosure is not limited thereto. That is, if the polarization direction of the light emitted from the shutter panel can be switched, a voltage value different from the ground potential may be applied to the segment electrodes during the above-described period in which the ground voltage is applied.

(3) In the first embodiment described above, the auxiliary electrode is arranged in the region Ra, and in the second embodiment described above, the auxiliary electrode is arranged outside the region Ra. However, the disclosure is not limited thereto. For example, the auxiliary electrode may be arranged both inside the region Ra and outside the region Ra.

(4) In the second embodiment described above, an example in which the auxiliary electrode is formed in a U-shape in a plan view is described. However, the disclosure is not limited thereto. For example, the auxiliary electrode may be formed in a circular shape or a quadrangular shape.

The above-described stereoscopic display device and the shutter panel can also be described as follows.

A stereoscopic display device according to a first configuration includes a display panel that alternately switches and displays a left-eye image and a right-eye image, and a shutter panel that switches between a state where light incident from the display panel is changed into emission light having a first polarization direction and the emission light is output and a state where light incident from the display panel is changed into emission light having a second polarization direction and the emission light is output, and the shutter panel includes a first electrode, a second electrode connected to a fixed potential, a liquid crystal layer arranged between the first electrode and the second electrode, a drive circuit that applies, to the first electrode, any one of a first voltage changing a polarization direction of the emission light into the first polarization direction and a second voltage changing the polarization direction of the emission light into the second polarization direction, the drive circuit switching a voltage applied to the first electrode between the first voltage and the second voltage in synchronization with the display panel switching between a display of the left-eye image and a display of the right-eye image, a third electrode connected to the fixed potential and arranged on a side opposite to the liquid crystal layer with respect to the second electrode, and an insulating layer arranged between the second electrode and the third electrode (first configuration).

Here, when the voltage applied to the first electrode changes between the first voltage and the second voltage, the potential of the second electrode changes from the fixed potential due to the wiring line or the like connected to the second electrode. At this time, the magnitude of the change in potential in the second electrode decreases as an electric capacitance formed between the second electrode and another conductive member increases. Therefore, according to the configuration described above, the second electrode and the third electrode are arranged via the insulating layer, so that an electric capacitance is formed between the second electrode and the third electrode. That is, in addition to the electric capacitance of the liquid crystal layer between the second electrode and the first electrode, an electric capacitance is also formed between the second electrode and the third electrode arranged on a side opposite to the liquid crystal layer with respect to the second electrode. Therefore, the electric capacitance formed between the second electrode and the other conductive member increases. Accordingly, it is possible to reduce the magnitude of the change in potential in the second electrode when the voltage applied to the first electrode changes. As a result, a change (blunting) in the waveform of the potential difference between the first electrode and the second electrode is reduced, and a change in the waveform of the voltage applied to the liquid crystal layer is reduced. Accordingly, a delay in the timing when the polarization direction of the light emitted from the shutter panel is switched with respect to the timing when the voltage applied to the first electrode is switched between the first voltage and the second voltage is prevented. The timing when the voltage applied to the first electrode is switched between the first voltage and the second voltage is synchronized with the timing (display timing) when the left-eye image and the right-eye image are switched, so that it is possible to prevent a delay in the timing when the polarization direction of light is changed by the shutter panel with respect to the display timing of the display panel.

In the first configuration, the drive circuit may be configured to apply the first voltage to the first electrode in a first period, to apply, to the first electrode, in a second period after the first period, a first overshoot voltage having a polarity different from a polarity of the first voltage and having an absolute value of a voltage value smaller than an absolute value of a voltage value of the first voltage, and to apply, to the first electrode, in a third period after the second period, the second voltage having a voltage value equal to the fixed potential (second configuration).

According to the second configuration described above, the first overshoot voltage having a polarity different from that of the first voltage is supplied to the first electrode in the second period, so that a potential difference between the first electrode and the second electrode can be reduced more quickly than in a case where the second voltage is supplied to the first electrode in the second period. As a result, it is possible to further prevent a delay in the timing when the polarization direction of light is changed by the shutter panel with respect to the display timing of the display panel.

In the second configuration, a configuration may be such that the shutter panel changes the polarization direction of the emission light from the first polarization direction to the second polarization direction in a state where the polarization direction of the emission light is changed to the first polarization direction and when a state where an absolute value of a voltage applied to the liquid crystal layer is greater than an OFF threshold value is changed to a state where the absolute value of the voltage applied to the liquid crystal layer is equal to or smaller than the OFF threshold value, and an electric capacitance Cs between the second electrode and the third electrode satisfies Expression (1a) below:

$$Cs > (|V1*CL|/|Voff|) - CL \qquad (1a)$$

where V1 is the first voltage, CL is an electric capacitance between the first electrode and the second electrode, and Voff is the OFF threshold value (third configuration).

Here, after the shutter panel changes the polarization direction of the emission light from the first polarization direction to the second polarization direction, the potential of the second electrode is a residual potential. On the other hand, according to the third configuration described above, the residual potential can be set to a value equal to or smaller than the OFF threshold value, and thus, it is possible to maintain a state where the absolute value of the voltage applied to the liquid crystal layer is equal to or smaller than the OFF threshold value.

In the second or third configuration, the drive circuit may be configured to supply, in a fourth period after the third period, a second overshoot voltage to the first electrode, the second overshoot voltage having an absolute value of a voltage value greater than an absolute value of a voltage value of the first voltage, and supply the first voltage to the first electrode in a fifth period after the fourth period (fourth configuration).

According to the fourth configuration described above, the second overshoot voltage having an absolute value of the voltage value greater than an absolute value of the voltage value of the first voltage is supplied to the first electrode in the fourth period, and thus, it is possible to more quickly increase the potential difference between the first electrode and the second electrode. As a result, even in a period after the third period, it is possible to prevent a delay in the timing when the polarization direction of light is changed by the shutter panel with respect to the display timing of the display panel.

In the fourth configuration, a configuration may be such that the shutter panel changes the polarization direction of the emission light from the second polarization direction to the first polarization direction in a state where the polarization direction of the emission light is changed to the second polarization direction and when a state where an absolute value of a voltage applied to the liquid crystal layer is smaller than an ON threshold value is changed to a state where the absolute value of the voltage applied to the liquid crystal layer is equal to or greater than the ON threshold value, and an electric capacitance Cs between the second electrode and the third electrode satisfies Expression (2a) below:

$$Cs > \{ |V1*CL|/(|V1|-|Von|) \} - CL \qquad (2a)$$

where V1 is the first voltage, CL is an electric capacitance between the first electrode and the second electrode, and Von is the ON threshold value (fifth configuration).

According to the fifth configuration described above, the residual potential can be set to a value equal to or greater than the ON threshold value, and thus, it is possible to maintain a state where the absolute value of the voltage applied to the liquid crystal layer is equal to or greater than the ON threshold value.

In the second or third configuration, the drive circuit may be configured to supply the first voltage to the first electrode in a fourth period after the third period (sixth configuration).

The response speed of the liquid crystal layer when changing from a state where the voltage difference in the liquid crystal layer is equal to or greater than the ON threshold value (ON state) to a state where the voltage difference is equal to or smaller than the OFF threshold value (OFF state) is lower than a response speed of the liquid crystal layer when changing from the OFF state to the ON state (the time constant increases). Therefore, when there is no problem in the response speed of the liquid crystal layer when changing from the OFF state to the ON state and there is little delay in the timing when the polarization direction of the light is changed by the shutter panel with respect to the display timing of the display panel when changing from the OFF state to the ON state, by adopting the sixth configuration described above, it is not necessary to generate a voltage having an absolute value of the voltage value greater than the absolute value of the voltage value of the first drive voltage. Thus, it is possible to simplify the configuration of the drive circuit.

In any one of the first to sixth configurations, the third electrode may include a transparent electrode (seventh configuration).

According to the seventh configuration described above, the third electrode can transmit light from the display panel.

In any one of the first to seventh configurations, the third electrode may be arranged outside a region where the shutter panel emits light in a plan view (eighth configuration).

According to the eighth configuration described above, it is possible to prevent the third electrode from blocking light from the display panel.

A shutter panel according to a ninth configuration is a shutter panel that switches between a state where light incident from a display panel that alternately switches and displays a left-eye image and a right-eye image is changed into emission light having a first polarization direction and the emission light is output and a state where light incident from the display panel is changed into emission light having a second polarization direction and the emission light is output, the shutter panel including a first electrode, a second electrode connected to a fixed potential, a liquid crystal layer arranged between the first electrode and the second electrode, a drive circuit that applies, to the first electrode, any one of a first voltage changing a polarization direction of the emission light into the first polarization direction and a second voltage changing the polarization direction of the emission light into the second polarization direction, the drive circuit switching a voltage applied to the first electrode between the first voltage and the second voltage in synchronization with the display panel switching between a display of the left-eye image and a display of the right-eye image, a third electrode connected to the fixed potential and arranged on a side opposite to the liquid crystal layer with respect to the second electrode, and an insulating layer arranged between the second electrode and the third electrode (ninth configuration).

According to the ninth configuration described above, it is possible to provide a shutter panel capable of preventing a delay in the timing when the polarization direction of light is changed by the shutter panel with respect to the display timing of the display panel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stereoscopic display device, comprising:
   a display panel configured to alternately switch and display a left-eye image and a right-eye image; and
   a shutter panel configured to switch between a state where light incident from the display panel is changed into emission light having a first polarization direction and the emission light is output and a state where the light incident from the display panel is changed into emission light having a second polarization direction and the emission light is output, wherein the shutter panel includes:

a first substrate on which a first electrode is formed;

a second substrate on which a second electrode to which a fixed potential is applied is formed;

a liquid crystal layer arranged between the first electrode and the second electrode;

a drive circuit configured to:

apply, to the first electrode, any one of a first voltage changing a polarization direction of the emission light into the first polarization direction and a second voltage changing the polarization direction of the emission light into the second polarization direction, and switch a voltage applied to the first electrode between the first voltage and the second voltage in synchronization with the display panel switching between a display of the left-eye image and a display of the right-eye image;

a third electrode to which the fixed potential is applied; and an insulating layer arranged between the second electrode and the third electrode, wherein the drive circuit is further configured to drive a liquid crystal of the liquid crystal layer by changing a potential of the first electrode in a state in which the fixed potential is applied to the second electrode and the third electrode, and wherein the shutter panel is configured such that, from bottom to top, the first substrate, the first electrode, the liquid crystal layer, the second electrode, the insulating layer, the third electrode, and the second substrate are sequentially arranged.

2. A stereoscopic display device, comprising:

a display panel configured to alternately switch and display a left-eye image and a right-eye image; and a shutter panel configured to switch between a state where light incident from the display panel is changed into emission light having a first polarization direction and the emission light is output and a state where the light incident from the display panel is changed into emission light having a second polarization direction and the emission light is output, wherein the shutter panel includes:

a first substrate on which a first electrode is formed;

a second substrate on which a second electrode to which a fixed potential is applied is formed;

a liquid crystal layer arranged between the first electrode and the second electrode;

a drive circuit configured to:

apply, to the first electrode, any one of a first voltage changing a polarization direction of the emission light into the first polarization direction and a second voltage changing the polarization direction of the emission light into the second polarization direction, and switch a voltage applied to the first electrode between the first voltage and the second voltage in synchronization with the display panel switching between a display of the left-eye image and a display of the right-eye image;

a third electrode to which the fixed potential is applied; and an insulating layer arranged between the second electrode and the third electrode, wherein the drive circuit is further configured to:

apply the first voltage to the first electrode in a first period, apply, to the first electrode, in a second period after the first period, a first overshoot voltage having a polarity different from a polarity of the first voltage and having an absolute value of a voltage value smaller than an absolute value of a voltage value of the first voltage, and the absolute value is different from the fixed potential, and apply, to the first electrode, in a third period after the second period, the second voltage having a voltage value equal to the fixed potential, and wherein the shutter panel is configured such that, from bottom to top, the first substrate, the first electrode, the liquid crystal layer, the second electrode, the insulating layer, the third electrode, and the second substrate are sequentially arranged.

3. The stereoscopic display device according to claim 2, wherein an electric capacitance Cs between the second electrode and the third electrode satisfies Expression (1) below:

$$Cs > (|V1*CL|/|Voff|) - CL \qquad (1)$$

where V1 is the first voltage, CL is an electric capacitance between the first electrode and the second electrode, and Voff is an OFF threshold value that is a threshold voltage of the liquid crystal layer for changing the polarization direction of the emitted light from the first polarization direction to the second polarization direction.

4. The stereoscopic display device according to claim 2, wherein the drive circuit is further configured to:

apply, in a fourth period after the third period, a second overshoot voltage to the first electrode, the second overshoot voltage having an absolute value of a voltage value greater than the absolute value of the voltage value of the first voltage, and apply the first voltage to the first electrode in a fifth period after the fourth period.

5. The stereoscopic display device according to claim 4, wherein an electric capacitance Cs between the second electrode and the third electrode satisfies Expression (2) below:

$$Cs > \{|V1*CL|/(|V1|-|Von|)\} - CL \qquad (2)$$

where V1 is the first voltage, CL is an electric capacitance between the first electrode and the second electrode, and Von is an ON threshold value that is a threshold voltage of the liquid crystal layer for changing the polarization direction of the emitted light from the second polarization direction to the first polarization direction.

6. The stereoscopic display device according to claim 2, wherein the drive circuit is further configured to apply the first voltage to the first electrode in a fourth period after the third period.

7. The stereoscopic display device according to claim 1, wherein the third electrode includes a transparent electrode.

8. The stereoscopic display device according to claim 1, wherein the third electrode is arranged outside a region where the shutter panel emits light in a plan view.

9. A shutter panel of a stereoscopic display device configured to switch between a state where light incident from a display panel configured to alternately switch and display a left-eye image and a right-eye image is changed into emission light having a first polarization direction and the emission light is output and a state where the light incident from the display panel is changed into emission light having a second polarization direction and the emission light is output, the shutter panel comprising: a first substrate on which a first electrode is formed; a second substrate on which a second electrode to which a fixed potential is applied is formed; a liquid crystal layer arranged between the first electrode and the second electrode; a drive circuit configured to: apply, to the first electrode, any one of a first voltage changing a polarization direction of the emission light into the first polarization direction and a second voltage changing the polarization direction of the emission light into the second polarization direction, and switch a voltage applied to the first electrode between the first voltage and the second voltage in synchronization with the display panel switching between a display of the left-eye image and a display of the right-eye image; a third electrode to which the fixed potential is applied and arranged between the second substrate and the second electrode; and an insulating layer arranged between the second electrode and the third electrode, wherein the drive circuit is further configured to drive a liquid crystal of the liquid crystal layer by changing a potential of the first electrode in a state in which the fixed potential is applied to the second electrode and the third electrode, and wherein, in a direction normal to the first substrate, the shutter panel is configured such that, from bottom to top, the first substrate, the first electrode, the liquid crystal layer, the second electrode, the insulating layer, the third electrode, and the second substrate are sequentially arranged.

10. The stereoscopic display device according to claim 1, wherein the third electrode is arranged to face the second electrode via the insulating layer.

11. The shutter panel of the stereoscopic display device according to claim 9, wherein the third electrode includes a transparent electrode.

12. The shutter panel of the stereoscopic display device according to claim 9, wherein the third electrode is arranged outside a region where the shutter panel emits light in a plan view.

13. The shutter panel of the stereoscopic display device according to claim 9, wherein the third electrode is arranged to face the second electrode via the insulating layer.

*   *   *   *   *